United States Patent Office 2,755,285
Patented July 17, 1956

2,755,285

1-SUBSTITUTED, 3-(5-NITRO-2-THIAZOLYL) UREAS

Robert C. O'Neill, New York, N. Y., and Arthur J. Basso, Colonia, and Karl Pfister III, Westfield, N. J., assignors to Merck & Co., Inc., Rahway, N. J., a corporation of New Jersey No Drawing. Application June 4, 1954,
Serial No. 434,682

13 Claims. (Cl. 260—306.8)

This invention relates to substituted urea and thiourea compounds. More particularly, this invention is concerned with novel 5-nitrothiazole derivatives of urea, thiourea and substituted ureas and thioureas and methods of producing such compounds. It is also concerned with the application of such compounds in the veterinary field, especially against harmful protozoal and histomonal infections to which fowl are susceptible, particularly *Histomonas meleagridis.*

According to the present invention novel 1-substituted-3-(5-nitro-2-thiazolyl) ureas and thioureas of the formula

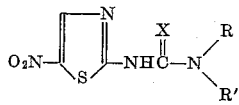

are provided, wherein X is oxygen or sulfur, and R is hydrogen or a hydrocarbon substituent such as an alkyl, alkenyl or aralkyl group and R' is a hydrocarbon substituent such as an alkyl, alkenyl or aralkyl group. Such hydrocarbon groups may be straight or branched chains and may also contain substituents such as nitro, cyano and halo groups. It has been found that such compounds have useful medicinal properties and are particularly suitable in the treatment and the prevention of enterohepatitis (blackhead) in turkeys.

It has been discovered that the novel N-monosubstituted ureas, i. e. R is hydrogen and R' is a hydrocarbon group, may be conveniently produced by reacting 2-amino-5-nitrothiazole with an appropriate alkyl alkenyl or aralkyl isocyanate or isothiocyanate. This reaction may be represented as follows:

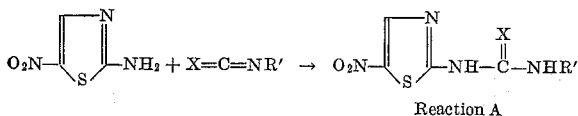

Reaction A wherein XX is oxygen or sulfur and R' is a hydrocarbon group such as an alkyl, alkenyl or aralkyl group.

With further regard to Formula I, the novel N,N-disubstituted ureas of this invention, i. e. R and R' are each hydrocarbon groups, may be conveniently produced by reacting 2-amino-5-nitrothiazole with an N,N-disubstituted carbamyl or thiocarbamyl chloride. This reaction may be represented as follows:

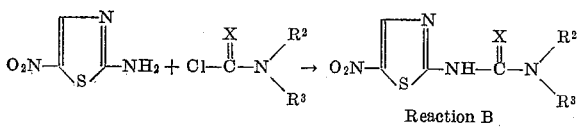

Reaction B wherein X is oxygen or sulfur and $R^2$ and $R^3$ are hydrocarbon groups such as alkyl, alkenyl and aralkyl groups.

Production of the novel 1-substituted-3-(5-nitro-2-thiazolyl) ureas and thioureas is readily achieved according to Reaction A above by contacting 2-amino-5-nitrothiazole with the appropriately substituted isocyanate or isothiocyanate in a substantially anhydrous inert organic solvent. Examples of anhydrous solvents which are satisfactory reaction media are dioxane, benzene, toluene, tetrahydrofuran, xylene, chlorinated hydrocarbons such as ethylene dichloride and high boiling ethers. The reaction proceeds at ordinary temperatures but it is generally preferred to employ elevated temperatures such as the reflux temperature of the reaction mixture. The ratio of reactants employed is not critical but for practical reasons substantially equivalent molar quantities are employed. The reaction goes to completion in from about 1 hour to 20 or more hours according to the reaction temperature employed and the particular reactants involved. In general though, reaction times of 2 to 12 hours are sufficient to complete the reaction at reflux temperatures. The desired reaction products are substantially insoluble in many organic solvents and therefore may be conveniently isolated by cooling the reaction mixture and filtering off the precipitated product.

Any monosubstituted isocyanate or isothiocyanate may be uesd in this reaction. It is preferred however to employ such compounds in which the substituent is an alkyl, alkenyl or aralkyl group of 8 carbons or less. Examples of such reactants which may be used are methyl isocyanate, ethyl isocyanate, propyl isocyanate, allyl isocyanate, benzyl isocyanate, phenylethyl isocyanate, and the corresponding substituted isothiocyanates. By employing such reactants with 2-amino-5-nitrothiazole, specific compounds such as 1-methyl-3-(5-nitro-2-thiazolyl) urea, 1-ethyl-3-(5-nitro-2-thiazolyl) urea, 1-propyl-3-(5-nitro-2-thiazolyl) urea, 1-butyl-3-(5-nitro-2-thiazolyl) urea, 1-allyl-3-(5 - nitro - 2 - thiazolyl) urea, 1-phenylethyl-3-(5-nitro-2-thiazolyl) urea, 1-(4-nitrophenyl)-3-(5-nitro-2-thiazolyl) urea, 1-methyl-3-(5-nitro-2-thiazolyl) thiourea, 1-ethyl-3-(5-nitro-2-thiazolyl) thiourea, 1-propyl-3-(5-nitro-2-thiazolyl) thiourea, 1-butyl-3-(5-nitro-2-thiazolyl) thiourea, 1-allyl-3-(5-nitro-2-thiazolyl) thiourea, and 1-phenylethyl-3-(5-nitro-2-thiazolyl) thiourea are produced.

The 1,1-disubstituted 3-(5-nitro-2-thiazolyl) ureas and thioureas described in Reaction B above may be conveniently preparted by contacting 2-amino-5-nitrothiazole with an appropriately N,N-disubstituted carbamyl or thiocarbamyl chloride in a substantially anhydrous inert solvent. Anhydrous inert solvents such as benzene, dioxane, ethylene dichloride and the like as previously described above may be employed as the reaction medium. Reaction begins after the reactants are brought together in a suitable reaction media at ordinary temperatures but may be increased by heating the mixture to an elevated temperature, preferably to the reflux temperature. The reaction period required varies with the temperature and at ordinary temperatures reaction is substantially complete in 5 to 12 hours whereas at elevated temperatures often 1–3 hours is sufficient. The desired product precipitates upon cooling the reaction mixture and is readily recovered by filtration.

Essentially any N,N-disubstituted carbamyl or thiocarbamyl chloride having the same or different hydrocarbon groups may be reacted with 2-amino-5-nitrothiazole according to this process to produce the corresponding 1,1-disubstituted 3-(5-nitro-2-thiazolyl) urea or thiourea. Preferably, N,N-disubstituted carbamyl or thiocarbamyl chlorides are employed in this reaction having alkyl, alkenyl and aralkyl groups of 8 carbons and less because such compounds are more readily available. Specific examples of some such reactants which may be suitably employed in this reaction are N,N-dimethyl carbamyl chloride, N,N-diethyl carbamyl chloride, N,N-dipropyl carbamyl chloride, N,N-dibutyl carbamyl chloride, N,N-diallyl carbamyl chloride, N,N-diphenylethyl carbamyl chloride, N,N-dimethyl thiocarbamyl chloride, N,N-diethyl thiocarbamyl chloride, N,N-dipropyl thiocarbamyl chloride, N,N-dibutyl thiocarbamyl chloride, N,N-diallyl thiocarbamyl chloride, N,N-diphenylethyl thiocarbamyl chloride, N-methyl-N-ethyl carbamyl chloride, N-methyl-N-phenylacetyl thiocarbamyl chloride and the like.

By employing such reactants with 2-amino-5-nitrothiazole, desired products such as 1,1-dimethyl-3-(5-nitro-2-thiazolyl) urea, 1,1-diethyl-3-(5-nitro-2-thiazolyl) urea, 1,1-dipropyl-3-(5-nitro-2-thiazolyl) urea, 1,1-dibutyl-3-(5-nitro-2-thiazolyl) urea, 1,1-diallyl-3-(5-nitro-2-thiazolyl) urea, 1,1-diphenylethyl-3-(5-nitro-2-thiazolyl) urea, 1,1-dimethyl-3-(5-nitro-2-thiazolyl) thiourea, 1,1-diethyl-3-(5-nitro-2-thiazolyl) thiourea, 1,1-dipropyl-3-(5-nitro-2-thiazolyl) thiourea, 1,1-dibutyl-3-(5-nitro-2-thiazolyl) thiourea, 1,1-diallyl-3-(5-nitro-2-thiazolyl) thiourea, 1,1-diphenylethyl-3-(5-nitro-2-thiazolyl) thiourea, 1-methyl-1-ethyl-3-(5-nitro-2-thiazolyl) urea, 1-methyl-1-phenylethyl-3-(5-nitro-2-thiazolyl) thiourea and the like may be produced.

As previously stated, these novel compounds have important anti-protozoal activity and are particularly valuable in the veterinary field. Thus, when administered in concentrations of about 0.005 to 0.3%, and preferably 0.02 to 0.1%, in the diet, the novel compounds of this invention are effective in the treatment and prevention of blackhead in turkeys. Such compounds may also be administered in the drinking water. The use of such compounds avoids and reduces to an inconsequential minimum many of the undesirable side effects such as reduced weight gain and other toxic manifestations normally associated with agents having activity against these diseases. In addition, the compounds of this invention are about 2 to 4 times more active gravimetrically in the treatment of turkey blackhead than other agents now used for this purpose.

The following examples are added to illustrate the production of specific compounds provided by this invention but it is understood that the invention is not to be restricted thereby to the embodiments disclosed in these examples.

EXAMPLE 1

*1-methyl-3-(5-nitro-2-thiazolyl) urea*

To 300 ml. of anhydrous toluene containing 17.0 g. of methyl isocyanate is added 28.8 g. of 2-amino-5-nitrothiazole. The stirred slurry is heated at reflux for a total of 20 hours and the 1-methyl-3-(5-nitro-2-thiazolyl) urea is recovered from the reaction mixture by filtration. The product is washed well with benzene and ether, and dried to constant weight; M. P. 243.5° C. (dec.); 99.4% yield.

EXAMPLE 2

*1-ethyl-3-(5-nitro-2-thiazolyl) urea*

About 69 g. of ethyl isocyanate is dissolved in 1200 ml. of dry toluene. To this solution is added 94 g. of 2-amino-5-nitrothiazole. The mixture is heated at reflux with stirring for 16½ hours. The reaction mixture is filtered at 80° C. to recover the solid 1-ethyl-3-(5-nitro-2-thiazolyl) urea. The product is washed with benzene, ether, and dried in air; M. P. 228° C. (dec.).

EXAMPLE 3

*1-butyl-3-(5-nitro-2-thiazolyl) urea*

The procedure of Example 2 is followed and 34.4 g. of n-butyl isocyanate is reacted with 29 g. of 2-amino-5-nitro-thiazole to produce 45 g. of yellow crystalline 1-butyl-3-(5-nitro-2-thiazolyl) urea (97.3% yield).

EXAMPLE 4

*1-hendecyl-3-(5-nitro-2-thiazolyl) urea*

To 425 ml. of dry toluene is added 79 g. of hendecylisocyanate and 43.5 g. of 2-amino-5-nitrothiazole with stirring. The mixture is refluxed for 24 hours and filtered while hot to recover 1-hendecyl-3-(5-nitro-2-thiazolyl) urea. The product is washed with ether and air-dried to constant weight.

EXAMPLE 5

*1-allyl-3-(5-nitro-2-thiazolyl) urea*

To 600 ml. of dry toluene is added 40 g. of allyl isocyanate and to the resulting solution is added 22 g. of 2-amino-5-nitrothiazole. The resulting suspension is heated at reflux for 20 hours with stirring. The reaction mixture is cooled and filtered to isolate 1-allyl-3-(5-nitro-2-thiazolyl) urea. The product is washed well with benzene, ether and air dried.

EXAMPLE 6

*1,1-dimethyl-3-(5-nitro-2-thiazolyl) urea*

14.5 grams of 2-amino-5-nitrothiazole is dissolved in 100 ml. of ethylene dichloride at 25° C. To this solution is added 16.1 g. of N,N-dimethyl carbamyl chloride with stirring. The resulting clear, amber-colored solution is heated at reflux for 2½ hours. The reaction mixture is cooled to room temperature and filtered to recover 1,1-dimethyl-3-(5-nitro-2-thiazolyl) urea. It is washed with ether and dried; M. P. 164–5° C.

Various changes and modifications of the invention can be made and, to the extent that such variations incorporate the spirit of this invention, they are intended to be included within the scope of the appended claims.

What is claimed is:

1. A compound of the formula

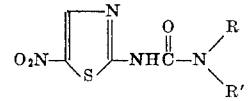

wherein R is a member from the group consisting of lower alkyl radicals, lower alkenyl radicals, and hydrogen, and R' is a member from the group consisting of lower alkyl and lower alkenyl radicals.

2. 1-lower alkyl-3-(5-nitro-2-thiazolyl) urea.
3. 1-methyl-3-(5-nitro-2-thiazolyl) urea.
4. 1-ethyl-3-(5-nitro-2-thiazolyl) urea.
5. 1-butyl-3-(5-nitro-2-thiazolyl) urea.
6. 1-allyl-3-(5-nitro-2-thiazolyl) urea.
7. 1,1-dimethyl-3-(5-nitro-2-thiazolyl) urea.
8. 1-lower alkenyl-3-(5-nitro-2-thiazolyl) urea.
9. The process which comprises reacting 2-amino-5-nitrothiazole with an isocyanate of the formula:

$$O=C=NR^1$$

wherein $R^1$ is a member from the group consisting of lower alkyl and lower alkenyl radicals, in a liquid reaction medium to produce a compound of the formula:

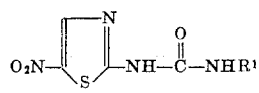

wherein $R^1$ has the significance previously assigned.

10. The process which comprises reacting 2-amino-5-nitrothiazole with a compound of the formula:

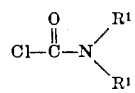

wherein $R^1$ is a member from the group consisting of lower alkyl and lower alkenyl radicals in the presence of a liquid reaction medium to produce a compound of the formula:

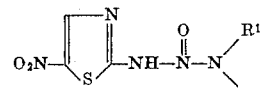

wherein $R^1$ has the significance previously assigned.

11. The process which comprises reacting 2-amino- 5-nitrothiazole with a lower alkyl isocyanate in the presence of a substantially anhydrous liquid reaction medium to produce a 1-alkyl-3-(5-nitro-2-thiazolyl) urea.

12. The process which comprises reacting 2-amino-5-nitrothiazole with ethyl isocyanate in the presence of a substantially anhydrous liquid reaction medium to produce 1-ethyl-3-(5-nitro-2-thiazolyl) urea.

13. The process which comprises reacting 2-amino-5-nitrothiazole with dimethyl carbamyl chloride in the presence of a substantially anhydrous liquid reaction medium to produce 1,1-dimethyl-3-(5-nitro-2-thiazolyl) urea.

References Cited in the file of this patent

UNITED STATES PATENTS

| | | |
|---|---|---|
| 2,531,756 | Waletzky et al. | Nov. 28, 1950 |
| 2,547,677 | Waletzky | Apr. 3, 1951 |